E. D. TILLYER.
PROCESS OF MAKING MULTIFOCAL LENSES.
APPLICATION FILED JAN. 10, 1921.
1,436,217.
Patented Nov. 21, 1922.
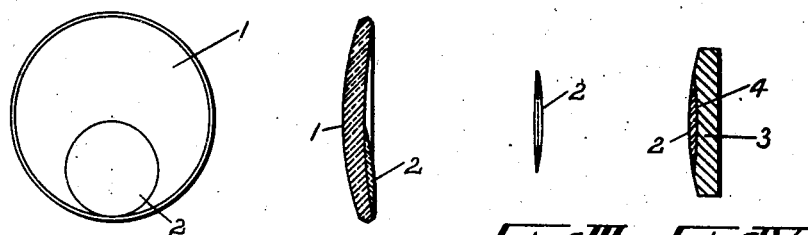
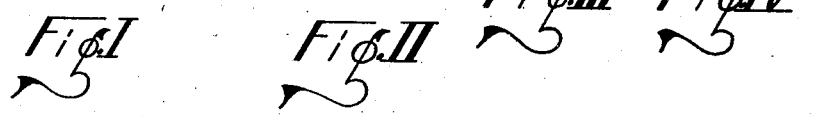
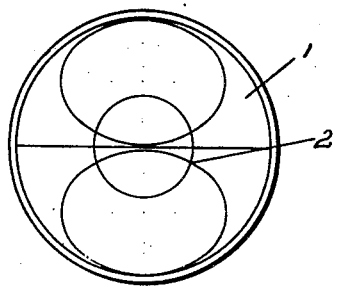
INVENTOR
EDGAR D. TILLYER
BY
ATTORNEYS Patented Nov. 21, 1922.

1,436,217

UNITED STATES PATENT OFFICE.

EDGAR D. TILLYER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

PROCESS OF MAKING MULTIFOCAL LENSES.

Application filed January 10, 1921. Serial No. 436,191.

*To all whom it may concern:*

Be it known that I, EDGAR D. TILLYER, a citizen of the United States, residing at Southbridge, in the county of Worcester and State of Massachusetts, have invented certain new and useful Improvements in Processes of Making Multifocal Lenses, of which the following is a specification.

This invention relates to improvements in ophthalmic lenses and has particular reference to bifocal or multifocal lenses.

The principal object of the present invention is the provision of a simple and inexpensively constructed form of multifocal lens which shall obviate the disadvantages present in the past in connection with cement or other two part bifocals, which shall possess the advantages of a lens formed from a single piece of glass with two different visual fields, while obviating the difficulties experienced in properly constructing a lens of this character.

A further object of the invention is the provision of a bifocal lens possessing the advantages of a lens formed from a single piece of glass but capable of construction much more readily and at less cost, and which shall not have the disadvantages due to color aberrations and difference in expansion of glass, etc., as have been present in various prior art forms of two part bifocals.

Other objects and advantages of my improved lens and process of forming the same should be readily apparent by reference to the following specification taken in connection with the accompanying drawings, and it will be understood that I may make any modifications in the specific details of construction shown and described within the scope of the appended claims without departing from or exceeding the spirit of my invention.

Figure I represents a front view of a lens embodying my improvements.

Figure II represents a vertical sectional view thereof.

Figure III represents a detail view of the segment or reading addition removed.

Figure IV represents a sectional view illustrating one step in the process of manufacturing my improved lens.

Figure V represents a plan view illustrating another step in said manufacture.

Figure VI represents a sectional view of the structure shown in Figure V.

Figure VII represents a view of a slightly modified method of carrying out my improved lens constructing process.

Prior to my invention I am aware that it has been customary to form bifocal or multifocal lenses from a single piece of glass by grinding different portions with different curves. I am also aware that bifocal lenses have been constructed by cementing two parts together or by forming a countersink in glass of one index of refraction and securing, by cement or otherwise, a segment or supplemental portion of a different index of refraction in the countersink. All of these types of construction have been open to certain objection, however. The manufacture of a lens from a single piece of glass, while producing a very satisfactory lens, is expensive if a proper lens be produced. On the other hand, two part lenses are liable to become separated, to cause Newton rings or other color aberration defects, and in the case of glass of different index of refraction difficulties due to dispersion and to expansion and contraction under different temperature conditions.

To obviate all of these difficulties I form my lens of two separate pieces of glass, preferably of the same coefficient of expansion, and of either the same or different indices of refraction, the feature of index of refraction being negligible in connection with my present invention. As shown in the drawings, my lens comprises a major portion, or complete lens member 1, having secured thereon the segment 2, which is in the form of a relatively thin wafer. To this extent the lens somewhat resembles the old cement bifocal of the prior art, the essential distinction, however, being that the portions in place of being secured together by cementing are fused or integrally united to form a single piece of glass. This result may be accomplished in a number of ways, two of which are illustrated in the drawings.

In Figures III and IV, I have illustrated one manner of constructing the segment or addition 2, Figure IV showing the same as mounted on a block 3 or slab of glass having a curved portion 4 of the same curvature as the curvature first finished on the segment, and on the opposite face, the portion 2 being ground down to a knife edge, the curve extending over and grinding away a portion of the block 4 to which the segment or addition is secured. After this grinding operation has been performed, the member 2 is removed, when it will be in the shape indicated in section in Figure III. My process then contemplates the suitable uniting of the member 2 with the main blank portion 1.

In Figure V, I have shown this portion 1 in the form of a large disc with the portion 2 placed centrally thereon, as is most clearly shown in Figure VI. On the other hand, in Figure VII, I have shown the member 1 as a single lens having the portion 2 disposed at one edge and held spaced at the outer edge from the member 1, as by the interposed spacing member 5. In either event the inner or bifocal bearing face of the member 1 has been suitably ground and polished and the member is preferably supported on a suitable block 6 for the fusing operation. It is to be noted that the member 1 is relatively thick or large in size, while the addition 2 is quite thin. This makes it possible to manufacture both of these parts from the same glass and to then support the member 2 on the member 1 in contact therewith at one or more points but spaced therefrom at others and to subject it to a heating action. This spacing may be accomplished as shown either by making the member 2 with a stronger curve than the curve of the member 1, supporting it by holding the members in spaced relation, as by the member 5, or in any other similar well known manner. The purpose of this is that as the parts are heated the heat preferably being applied from above, as by a suitable blow pipe, furnace, or the like, the member 2 will be heated through and in soft or pliable condition and will shape itself down onto the underlying surface of the member 1 and become fused of permanently united with said member 1. It is a recognized fact that by proper control of the time and temperature the member 2 may be caused to drop to and exactly fit the member 1 without any flattening or changing in relative thickness of the member 2 at its several points, the final result being that the member 1 will have an integral lump thereon adding to it the power which previously separately existed in the member 2. This is due to the peculiarity of the action of glass under these conditions, that it will curve down from its own original form to a different form or shape without materially varying the relationship between its two surfaces so that the addition will be substantially the same as the original value of the member 2 by itself.

Such slight variation as may occur in the melting due to particular furnace conditions under which the work is done, can be readily calculated in advance and allowed for in the grinding of the lens.

After the parts have been fused together to provide an integral piece of glass having one reading correction and a different distance correction, or in other words, having a plurality of bifocal points providing a multifocal lens, the blank may be suitably cut to desired shape. It may also, either previous to the attaching of the segment, or subsequent thereto, be surfaced on the opposite side with a single curve in the usual manner giving the desired prescription to be placed before the eye.

While I have referred to the fact that the parts may be of the same identical glass if desired, I find that frequently most satisfactory results may be accomplished at a slightly lower melting or softening point for the member 2 than has the major blank, thus eliminating all liability of change of curve of the major portion 1 during the uniting operation. An example of glass satisfactory for this purpose would be if the member 1 were formed from the borosilicate crown glass and the member 2 formed from the ordinary crown glass having the lower softening or melting point.

It will thus be seen that my improved process contemplates the surfacing of a major lens on one or both sides in the usual manner and the separate surfacing of a second glass to be united with the first, the second glass in all instances being surfaced on both sides in the final finished form and with the desired variation in focal value from the first and subsequent uniting of the two parts together in a permanent manner as by fusion to form a single one-piece glass from two parts producing one focal value through the single lens and a second focal value through the double or united parts, which is substantially the sum of the focal values of the two parts as previously constructed.

I claim:

1. The process of producing a bifocal lens consisting in polishing a major surface, polishing a second member in a completed lens, subjecting the parts to heat which will unite the two in a unitary structure possessing through part the focal value of the first member and through another part the combined or added focal values of the two members considered separately.

2. The process of producing a multifocal lens consisting in grinding a major portion with a single continuous curve, grinding the minor portion with a single curve on each side to produce the desired addition, superimposing the minor on the major part and uniting the two by fusion into a single piece.

3. The process of producing a multifocal lens consisting in surfacing a major blank on one side, surfacing a reading segment on both sides, one of said sides having a curve differing from that of the surface of the major blank, placing said surface opposed to the surface of the major blank, and softening the segment by heating to cause its edges to subside onto and unite with the major blank.

4. The process of constructing a multifocal lens consisting in shaping a major portion, shaping another portion to produce a desired focal value, superimposing the parts and subjecting the parts to a heat which will unite the same without altering their focal value.

5. The process of producing multifocal lenses consisting in preparing a major blank with a finished surface, preparing a thin wafer addition finished on both surfaces and to a knife edge, and subjecting the parts to heat sufficient to soften and unite the wafer with the major portion.

In testimony whereof I have affixed my signature, in presence of two witnesses.

EDGAR D. TILLYER.

Witnesses:
ALICE G. HASKELL,
ESTHER M. LAFLER.